United States Patent
Chittenden et al.

(10) Patent No.: US 8,122,152 B2
(45) Date of Patent: Feb. 21, 2012

(54) SYSTEMS AND METHODS FOR NETWORK USER RESOLUTION

(75) Inventors: Bruce Chittenden, Englewood, CO (US); William Madden, Englewood, CO (US); Myk Willis, Englewood, CO (US)

(73) Assignee: Trustwave Holdings, Inc., Chicago, IL (US)

(*) Notice: Subject to any disclaimer, the term of this patent is extended or adjusted under 35 U.S.C. 154(b) by 913 days.

(21) Appl. No.: 10/965,276

(22) Filed: Oct. 14, 2004

(65) Prior Publication Data

US 2005/0089048 A1    Apr. 28, 2005

Related U.S. Application Data (60) Provisional application No. 60/513,882, filed on Oct. 23, 2003.

(51) Int. Cl.
*G06F 15/16*    (2006.01)
(52) U.S. Cl. .......................... 709/245; 709/226; 709/227
(58) Field of Classification Search .................. 709/205, 709/236, 245
See application file for complete search history.

(56) References Cited

U.S. PATENT DOCUMENTS

| | | | |
|---|---|---|---|
| 6,118,768 A * | 9/2000 | Bhatia et al. | 370/254 |
| 6,292,838 B1 * | 9/2001 | Nelson | 709/236 |
| 6,829,239 B1 * | 12/2004 | Bhatia et al. | 370/392 |
| 2002/0141390 A1 * | 10/2002 | Fangman et al. | 370/352 |
| 2002/0150083 A1 * | 10/2002 | Fangman et al. | 370/352 |
| 2003/0177187 A1 * | 9/2003 | Levine et al. | 709/205 |
| 2005/0286503 A1 * | 12/2005 | Oda et al. | 370/355 |

OTHER PUBLICATIONS

Introduction to TCP/IP, Microsoft Corporation, Sep. 1998.
Appendix C-TCP and UDP Port Assignments.
Andrew Reitz and Robin Kravets, The Dynamic Port Reservation Protocol, May 9, 2002.

\* cited by examiner

*Primary Examiner* — Jeffrey Pwu
*Assistant Examiner* — Sulaiman Nooristany
(74) *Attorney, Agent, or Firm* — Hanley, Flight & Zimmerman, L.L.C.

(57) ABSTRACT

Systems and software that enable mapping of a particular network transaction with a specific computer and user in an organization. The network packet may be a live in-transit packet, or a packet that occurred at some time in the past. In a particular implementation, a database currently comprises a collection of records containing fields for username, computer name, IP address of the computer, and logon time. A name resolution is performed by taking an IP address and time as input, and determining from the records in the database what user's computer owned the IP address at that time.

18 Claims, 4 Drawing Sheets

SYSTEMS AND METHODS FOR NETWORK USER RESOLUTION

This application claims the benefit of U.S. Provisional Application Ser. No. 60/513,882 filed on Oct. 23, 2003 entitled METHOD AND APPARATUS FOR NAME RESOLUTION, which is incorporated herein by reference.

BACKGROUND OF THE INVENTION

1. Field of the Invention

The present invention relates, in general, to data communication network management, and, more particularly, to software, systems and methods for resolving the identity of a user of a network attached computer when multiple users have access to the network attached computer.

2. Relevant Background

Various network management tasks would benefit from being able to associate particular network activities and events with specific users. Examples include access control, auditing, bandwidth management, network blocking, network filtering, usage policy management, troubleshooting, quality of service management, prioritization of service, and the like. However, network communication packets are associated only with a network address, such as an internet protocol (IP) address, assigned to each network connection when a machine attaches to a network. In most networks each machine uses a single connection that is shared by all users and all software processes that access the network. In other systems, called "multi-homed", a network connected device may have multiple connections, however, these connections may also be shared amongst multiple users and software processes.

A network connection is shared by multiple software processes executing on a machine. So that network packets are directed to the correct software process the transmission control protocol (TCP) typically used with IP packets uses a port number in combination with the IP address to uniquely identify each process. In a typical system a port number may range from 0 to 65535. Port numbers below 1024 are reserved as "well-known" or otherwise registered for use with particular applications.

It is common for network-connected devices to require some form of user log-in to gain access in which the user identifies himself or herself and provides some form of credentials (e.g., a password, certificate and the like) to authenticate their identity. An authentication authority, such as a domain controller, authenticates a user and establishes a session, usually having a defined lifetime, for that user. In some cases a user must log in to each network resource that is being used, while in other cases a user logs in one time and is granted access to all network-connected resources. Increasingly, domain-based access control is becoming prevalent in which a network administrator defines domains comprising a collection of network resources that allow users to log into an entire domain with a single authentication. In each of these cases, once a user logs in subsequent network activity rarely requires that the user provide authentication credentials again. Once authenticated, the network coupled devices operate as if the original user that logged in remains logged in until a log out operation occurs or the user's session times out. Significantly, the session is logically independent of the machine address assigned to a network connection used by a device.

Hence, network activities as represented by the communication packets are able to use a network address to identify the machine involved in the activity and/or the port number to identify a software process using the network connection, but neither of these techniques are able to resolve the user associated with a network packet. Associating a user identification with a network packet is made even more complex by the common use of dynamic addressing in which network addresses are automatically assigned to connections such that the mapping between machines and network addresses is frequently changing.

In the case of single user devices (e.g., a workstation) the network address is usually correlated with the single user that is the authenticated user for the device. Essentially, very little if any network traffic occurs unless the single authorized user is logged into and authenticated on the device. Hence, by correlating the network address with a particular machine to which that address is assigned one can assume that the single authorized user is associated with each packet.

In multi-user environments, however, the problem of associating a particular user with an in-transit or stored packet is much more difficult. A multi-user device allows for multiple users to use the same computer at the same time and/or different times. A multi user device might include, for example, a workstation that implements multiple user accounts such as Linux, Unix, Windows 2000 and Windows XP, among others, as well as remote access technologies such as Microsoft Windows Terminal Services, Citrix MetaFrame Services and the like. In addition to work-station, remote access, and home computer type devices, multi-user devices might also include a variety of appliances such as cash registers, office equipment, set top boxes, home automation controls, and the like in which multiple people or software processes are authorized to use the machine at the same time or at different times.

It is possible to use a script invoked by a mandatory client-side agent to capture information when user logs onto a workstation. This mechanism is generally effective so long as all machines that couple to a network can be forced to execute the script. However, logins of local (non-domain) users who do not run login scripts are not recorded. Also, network addresses can change. A workstation's IP address can change, even with an interactive user currently logged in. While this is a rare occurrence for traditional fixed-location desktop workstations, portable and mobile computing devices change network addresses when roaming to different wireless networks in a building, suspending and resuming, physically connecting to different networks in different conference rooms, and the like. Also, when logging into a virtual private network (VPN) or remote access server (RAS), login scripts are often not invoked. Another limitation of script-based solutions is that while a script can, with exceptions such as those noted above, be relied on to capture a logon event, capturing logoff events is more difficult. As a result, it is possible to incorrectly attribute network traffic to a user that has in fact already logged off.

In a Windows 2000 environment, there are objects in the active directory that map computer names to IP addresses, and even purport to give the name of the current interactive user for a machine. Unfortunately, the loose consistency model of Active Directory makes it difficult if not impossible to rely on its data for real-time mapping of IP addresses to computers and there to users. Multiple replicas of each domain's data exist on various domain controllers in the organization, and there may, in extreme cases, be spans of several hours during which one domain controller will have out of date data.

Similar problems occur when Windows 2000 domain name service (DNS) servers are being used, and they are configured to store zone information in Active Directory. In this case, zone data is replicated between master and slave name servers in a manner dictated by Active Directory replication semantics. Again, this can result in a DNS server in one site having different hostname-to-IP mappings then that of another DNS server in another zone.

Another alternative for legacy networks that are still using NetBIOS is to use commands such as NBTSTAT to determine the user logged in at a particular time. A drawback to this approach is that corporations are phasing out NetBIOS and there is no time stamp associated with NetBIOS so it is possible to query the wrong user/machine name for a particular event.

As a result, devices such as network management tools that monitor and manage network traffic are not able to resolve a user identification from a particular packet. These devices are only able to resolve machine identification (e.g., an IP address) from the packet. When actual user identification is required the packets must be painstakingly correlated with information logged by other machines and services (e.g., network and/or domain controller logs) when such information is available.

Hence, there remains a need for methods and systems that provide improved name resolution in multi-user systems such that particular individual users can be identified with improved accuracy and resolution from information contained in packet communications.

SUMMARY OF THE INVENTION

Briefly stated, the present invention involves systems and software that enable mapping of a particular network transaction with a specific computer and user in an organization. The network packet may be a live in-transit packet, or a packet that occurred at some time in the past. In a particular implementation, a database currently comprises a collection of records containing fields for username, computer name, IP address of the computer, and logon time. A name resolution is performed by taking an IP address and time as input, and determining from the records in the database what user's computer owned the IP address at that time.

In another aspect the present invention involves network management applications that use information associating particular network communication packets with particular users to implement per-user management behaviors. For example, the present invention contemplates a network monitoring application that operates identify the particular user that generated network traffic (e.g., web traffic, email, peer-to-peer file transfer, instant messaging, and the like). Compliance with network usage policies and per-user enforcement of network usage policies can be implemented using the information obtained by the present invention. Network blocking and/or filtering applications identify a particular user that is requesting a network resource, and determine whether to allow or disallow access to that resource on a per-user basis. Bandwidth Monitoring applications are operable to monitor and/or enforce compliance with network bandwidth limits on a per-user and/or group basis.

In yet another aspect, the present invention involves a network service implemented by processes in a centralized network server that allow any application to determine the user name associated with network traffic. The traffic may involve traffic directed to the application itself, or may involve traffic that is observed but not directed to the application. In particular, the present invention allows the user identity to be determined using a network address and port number pair even when a Multi-User System generated the network traffic.

DETAILED DESCRIPTION OF THE PREFERRED EMBODIMENTS

The present invention is illustrated and described in terms of a database with which it is possible to map a particular network transaction that occurred at some time in the past with a specific computer and computer user on the network. The invention is described in terms of a centralized database having a plurality of name resolution records, where each record contains fields for user name, computer name, network address (e.g., IP address), logon time, and an indication of one or more port numbers allocated to that user. In a particular implementation, network communication packets initiated on behalf of a user are assigned port numbers from the one or more port numbers allocated to that particular user. A name resolution is performed by In a first implementation, the port number assigned to a network session is captured when a network session is created. The process that initiated the network session is determined through a first system call and the user name for that process is determined using a second system call. The user name and network address (e.g., IP address) are concatenated with the port number and stored, along with other desirable information such as a time indicating when the network session was initiated. The information stored in the database can be accessed such that when the network address and port number pair are input to the database the user name is returned. This first implementation requires minimal if any changes to the operating system. On the other hand, this first implementation solution requires capturing, storing, and accessing records for what may be hundreds of network sessions that are initiated every second.

A second implementation involves creating a unique network address for each user on a multi-user system. In essence, a subnet is configured having a range of address space assigned to the multi-user system. For example, network addresses 10.1.1.1 thru 10.1.1.255 are assigned to users on a particular system. The network stack is modified to associate the IP Address range of the subnet to a particular multi-user system and to associate each user with a particular network address from the range of network addresses assigned to that multi-user system. The network stack ensures that the outgoing and incoming network traffic is routed to the correct user's applications. A table is maintained with each user's login and logoff time, user name, and IP Address. Because each user in the second implementation has a unique network address, multiple instances of applications can exist simultaneously on one system even where each application instance requires a unique network address.

This second implementation may cause application compatibility issues due to multiple network addresses being assigned to one machine/network interface. There may also be configuration issues since a group of network addresses must be reserved for each multi-user system to ensure the multi-user system has sufficient addresses for all possible users. In other words, because a subnet in an IPv4 network is limited to 255 IP addresses, some implementations will require additional subnets might be allocated to a multi-user system to accommodate more than 255 concurrent users.

In a third and preferred implementation, when a user logs into a multi-user system the user name is captured and the user is assigned a unique range of port numbers that are used each time a network session is initiated. The user name, network address and range of allowable port numbers are stored in a database along with other information such as such as a time indicating when the network session was initiated. The information stored in the database can be accessed such that when the network address and port number pair are input to the database the user name is returned. The third implementation is simpler to implement in that it creates a unique one-to-one mapping between user name and a network address:port number pair.

Figure 1:
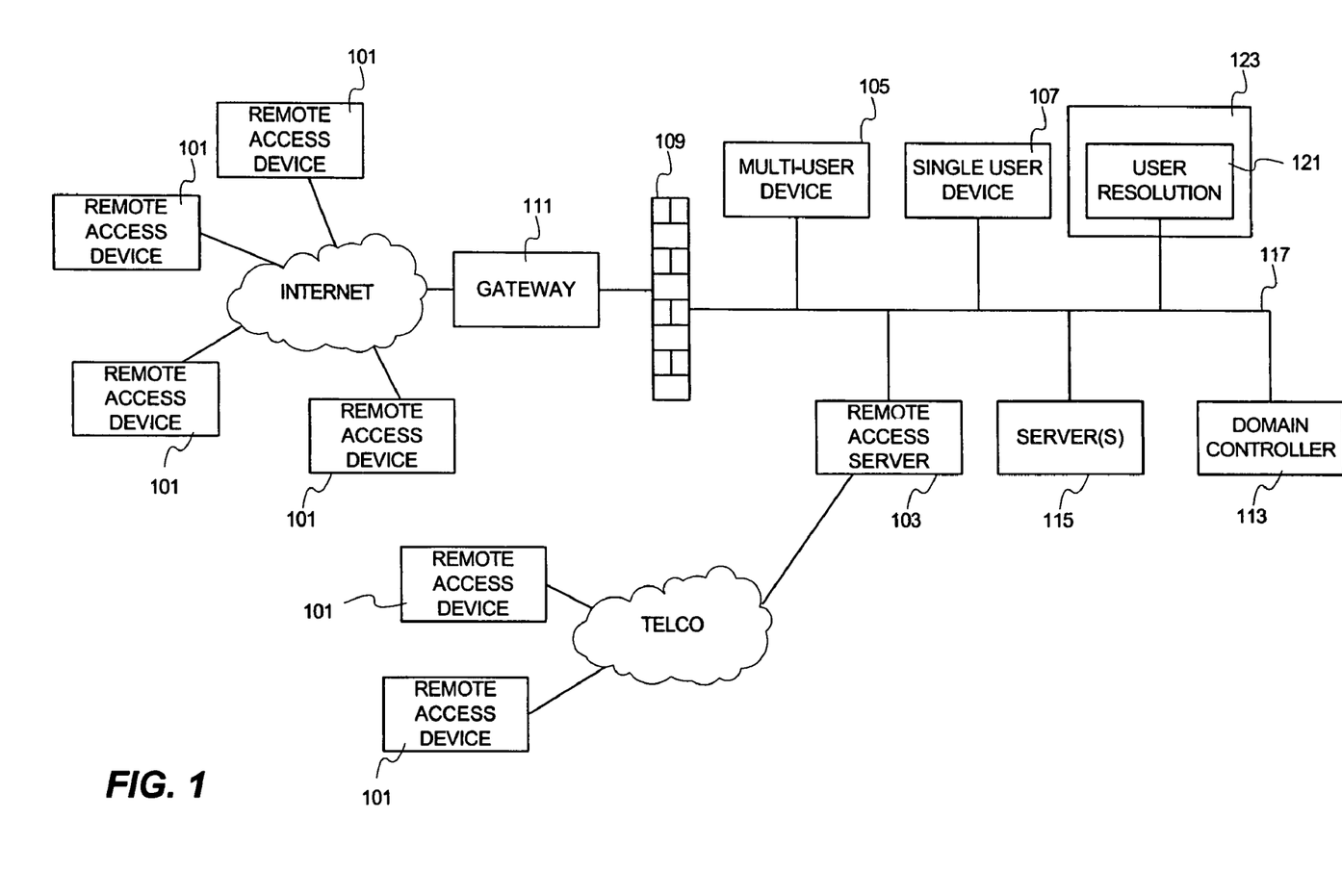
FIG. 1 illustrates a system in accordance with a particular embodiment of the present invention.

FIG. 1 illustrates a system in accordance with a particular embodiment of the present invention. In the system of FIG. 1 a number of devices are connected by network infrastructure to enable communication between the devices. Remote access devices 101 couple to the other devices through, for example, an Internet gateway 111 or using a modem through conventional communication lines provided by a telephone company (e.g., POTS lines, ISDN lines and the like). Remote access devices 101 include fixed location workstation and desktop computers, mobile computing devices, laptop computers, handheld computers as well as appliances and special purpose computing devices.

Network 117 represents, for example, a corporate wide area network (WAN) or local area network (LAN) that includes a variety of devices coupled together by network infrastructure and often separated from public networks by a firewall 109. These devices include single user devices 107, multi-user devices 105 as well as servers 115 that provide various shared application functionality, file management, database management and the like. Single user devices 107 represent devices such as workstations or desktop computers that have a single authorized user. Multi-user devices 105 include devices such as workstations and desktops that have multi-user operating systems and therefore allow multiple concurrent users. In addition to conventional desktop computing, multi-user devices may be used to implement various appliance-like functions in a network 117.

Optionally, domain controller 113 is used to manage access to network resources. Although other authentication and network management mechanisms are compatible with the present invention, domain controller 113, which may be implemented as a primary domain controller and one or more backup domain controllers, manages a master user database that implements user authentication and logon functions, specifies resources that may be used by authenticated users, and logs network usage on a user level. Domain controller 113 may be implemented as a stand-alone machine or within servers 115. In operation, users of a single user device 107 and multi-user device 105 logon to the domain and then are granted access to other network-coupled resources (e.g., services provided by servers 115).

Remote access server 103 is a kind of multi-user device implementing processes such as a Microsoft Windows Terminal Services, Citrix MetaFrame Services and the like. Remote access server 103 is coupled to the network 117 and can logon to the domain in a manner akin to single user devices 107 and multi-user devices 105. Remote access server 103 implements interfaces for communicating with remote access devices through telephone company lines and/or network communications through firewall 109 (e.g., a virtual private network or "VPN"). Remote access devices 101 couple to the remote access server 103 which then implements a session for that user. Although the remote access server 103 hosts multiple concurrent sessions, each remote access device appears to have an independent connection to network 117. From the network's perspective, remote access server 103 appears to be a multi-user device 105 with several concurrent users.

Typically, a single network address is assigned to each device coupled to network 117. The network address assigned to any particular device may be statically defined for servers 115, but, more typically, is dynamically assigned by DHCP processes implemented in one or more servers 115. All network communications with a particular device bear the single network address assigned to that device. In accordance with the present invention, a multi-user device 105 and/or remote access server 103 is modified to maintain assign port numbers to communication packets on user ID basis. Hence, network packets on network 117 include indicia, in the form of port numbers, that enable a third party service such as user resolution service 121 to identify a particular user by examining a network packet.

In the particular implementations, the transport component of the network stack in each multi-user device 105 and/or remote access server 103 is modified such that the normal processes that assign port numbers randomly or arbitrarily are bypassed in favor of processes that assign port numbers based on the session ID associated with a process requesting the port number. Each machine 105/103 may maintain various data structures, described in greater detail below, to track port numbers that are allocated to particular session IDs, and session IDs that are assigned to particular users. Alternatively or in addition these data structures may be implemented in a centralized fashion in a centralized user resolution component 121 that may, in turn, be provided as part of a network management device 123.

Figure 2A:
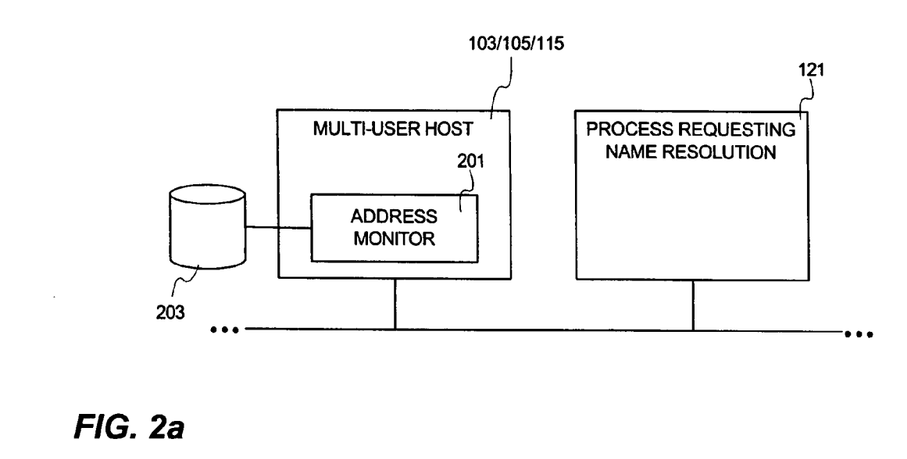
FIG. 2A shows components of an implementation of the present invention.
Figure 2B:
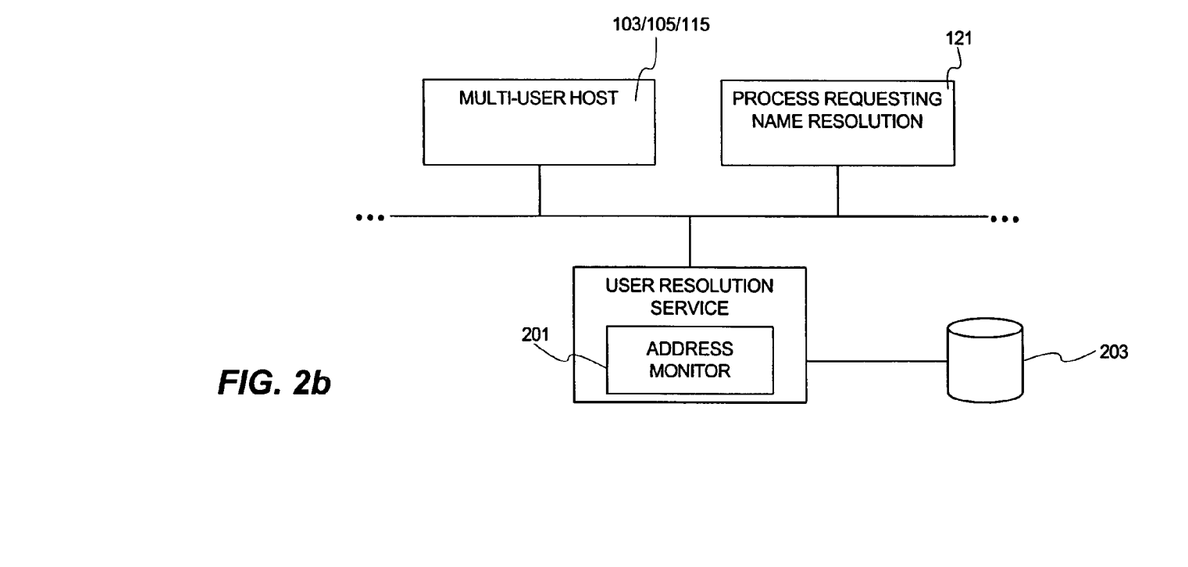
FIG. 2B shows components of another implementation of the present invention.

FIG. 2A shows components of an implementation of the present invention in which data structures that make up a user resolution database 203 are maintained locally at each multi-user machine while FIG. 2B shows components of an alternative implementation of the present invention in which user resolution database 203 is implemented in a centralized fashion. Centralization is useful in that third party devices and programs, such as network management tools, do not need to access multi-user devices 105 whenever it is desired to identify the user associated with a network packet.

In the implementation of FIG. 2A process call an "Address Monitor" executes on the multi-user server to monitors when a network session is opened, closed, and the time each of these operations occurred. The system then maintains a list of addresses and port numbers as well as time periods they were used for each user on that host server. While the IP address for a particular server changes infrequently, the port number is unique for each request. For this reason, it is important to have an efficient mechanism to store the port number information for each user and to have an aging mechanism so that old entries are purged after a period of time.

For other processes to resolve the network activity to a particular user, they pass in the network address information (typically the IP address and port number) along with the time the request occurred into the Address Monitor. The Address Monitor process returns the username that is associated with that particular request based on the information passed in. As an implementation detail, the list of network information, times, and usernames could be maintained by a separate process from of the multi-user server as shown in the implementation of FIG. 2B.

Figure 3:
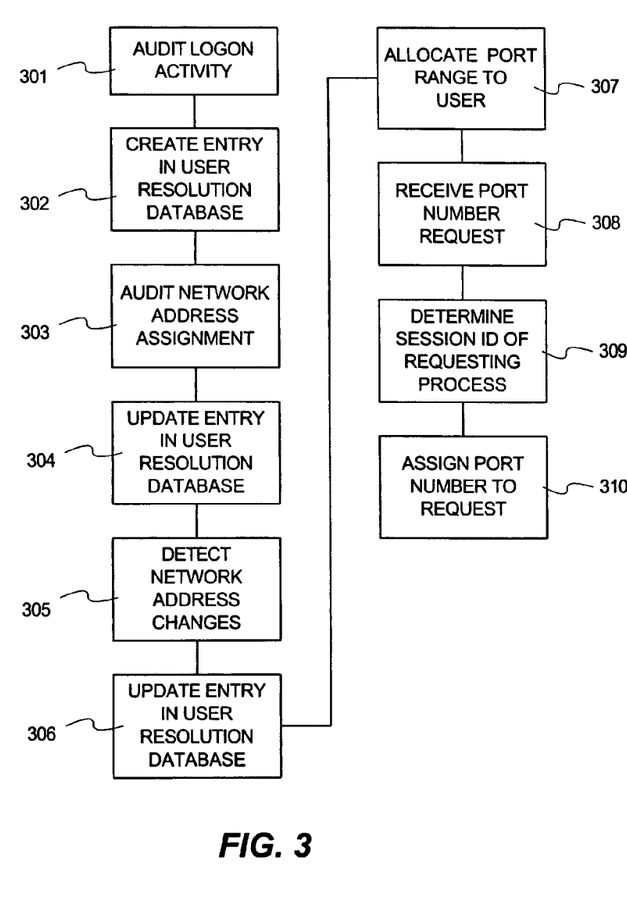
FIG. 3 illustrations operations in accordance with an embodiment of the present invention.

FIG. 3 illustrates operational activities involved in an implementation of the present invention. In activity 301, a logon event is audited to obtain the user name and logon time for a particular user. Windows 2000, for example, allows for account logon events to be audited, such that any time a user is authenticated by the domain controller (or a local machine), a message is written to an event log. While this policy is not enabled by default, it is simple to do so and has a minimal impact on system performance. As logon auditing is such a basic security measure, the policy is likely already enabled in most security-conscious installations. To enable account logon security auditing, the "Audit account logon events" policy should be enabled for all domain controllers in the organization. Once enabled, this policy causes an event to be written to the event log of the domain controller each time it authenticates a user. The event contains the username of the logged on user as well as the name of the workstation to which they logged in.

In activity 302, the logon event information is used as the basis for an entry in a name resolution database 203 in accordance with the present invention. In the particular example of a Windows 2000 operating environment, Windows Management Instrumentation (WMI) APIs that are accessible to any COM-capable programming environment can be used to retrieve the logon information from the user's event log. Another alternative is to directly access the event log on the domain controller to gather information on users logging onto the network. One benefit of using the WMI interfaces to access a remote computer's event log is that it is possible to register an application such that it is asynchronously notified upon creation of each new event log entry. This capability is based on WMI's general event notification model, and would allow an application, for example, to write an entry to the user resolution database 203 whenever a user authenticates against a domain controller. This application could run as a background process on a single network-coupled machine in each organization, and make connections to monitor each of the organization's authenticating domain controllers 113. Domain controllers 113 can be located automatically using simple Active Directory queries, relieving the administrator of any configuration requirements. In response to receiving notification of a new logon event, a logon detection agent writes a new entry to the name resolution database 203. The result of this approach is substantially similar to those achieved using login scripts, however, the method taught herein has the advantage of detecting all domain user logons, regardless of whether or not a login script is executed as part of the authentication. It also requires the installation of only a single executable on one machine in the enterprise.

Because the network address(es) assigned to a workstation can change dynamically in many network environments, it is important that user resolution records are aware of these changes in order to accurately associating each network transaction with a correct user. In activity 303 the initial address assignment (i.e., the network address(es) assigned to a machine when the user logon event is captured) is audited and the address information recorded in the user resolution record for that user in database 203.

Specifically, the network stack of a network connected device generally includes a dynamic host configuration protocol (DHCP) client that is configured to obtain network parameters for the workstation, including (among many other things) the IP address. DHCP is supported by a Windows 2000 DHCP server, which is configured to give workstations IP addresses out of a predefined pool. When a network address assignment is made by DHCP, it is usually logged by the DHCP server. The logged information is written to the event log of the DHCP server. Also, upon granting an IP address to a DHCP client, the DHCP server is generally configured to update a Dynamic DNS server. The DNS server stores information mapping host names to IP addresses in a record called the A record. A PTR record is also stored to allows IP addresses to be mapped back to host names in a PTR record. In this manner, the DHCP service and/or the DNS service can be used to obtain network address information in operation 303, and to detect changes in network addresses in operation 305. Alternatively or in addition an agent can be implemented on a user's machine to monitor network address assignment and network address changes locally and report to a centralized service that maintains the user resolution records.

One resource that is shared between all users on a multi-user system is the network address of the machine. That is, every user on a terminal server machine has the same source IP address at the same time, making it normally impossible to determine based on source IP address alone the user responsible for a network operation. Mapping IP addresses to users in a multi-user environment must therefore rely on some sort of additional information in order to function reliably.

Source port numbers are conventionally assigned in a manner that does not take user identity into account; any port number may be assigned to applications owned by any user, and port numbers are assigned to other user's applications as soon as they are released. For example, in a Windows environment the TCP/IP layer assigns a port number from the range [1024-5000] randomly whenever a process requests a bind with a port specified as 0. The TCP layer keeps track of which port numbers are in use so that a port number that is in use is not assigned to a requesting process. When the process releases the port number it is reused for a subsequently requesting process. Thus, client ports are frequently recycled between multiple applications, which are potentially owned by different users.

The preferred implementations of the present invention us an active filter technique to assign port numbers that manipulates the behavior of the transport driver (e.g., TCP layer of a network stack) as it performs operations associated with local port assignment. This is shown and described in greater detail with reference to FIG. 5. In the case of applications such as web browsers, port numbers are used for a short period of time before being released back to the transport driver. The transport driver is then free to reassign the port number to any other process within the session that subsequently requests a system-assigned port. The user resolution record 400 (shown in FIG. 4) tracks which port numbers allocated to a user for a given time period. In accordance with the present invention, by controlling the allocation of ephemeral ports such that a given port is never (within some arbitrarily-chosen time period) assigned to applications owned by different users, it is possible to efficiently associate network traffic, which is marked with the port number, with particular users.

Figure 4:
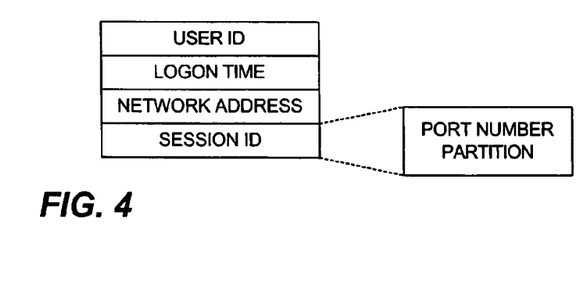
FIG. 4 shows a user resolution record in accordance with the present invention.

FIG. 4 shows an exemplary user resolution record which is created for each concurrent user when that user logs on. Each record creates an association between the user ID, logon time, network address, and an indicia of the port partition p(s) that is allocated to that user. While the user resolution record 400 shown in FIG. 4 may include any indicia of the port range allocated to the particular user, in a particular implementation the session ID is used to indicate the allocated port partition. Using this scheme, it is only necessary to record the user's session ID when they logon, and an external agent then determines which source ports they 'own' on the multi-user machine. In this manner, network transactions which include the port number can be mapped back to a specific user on a multi-user machine.

Figure 5:
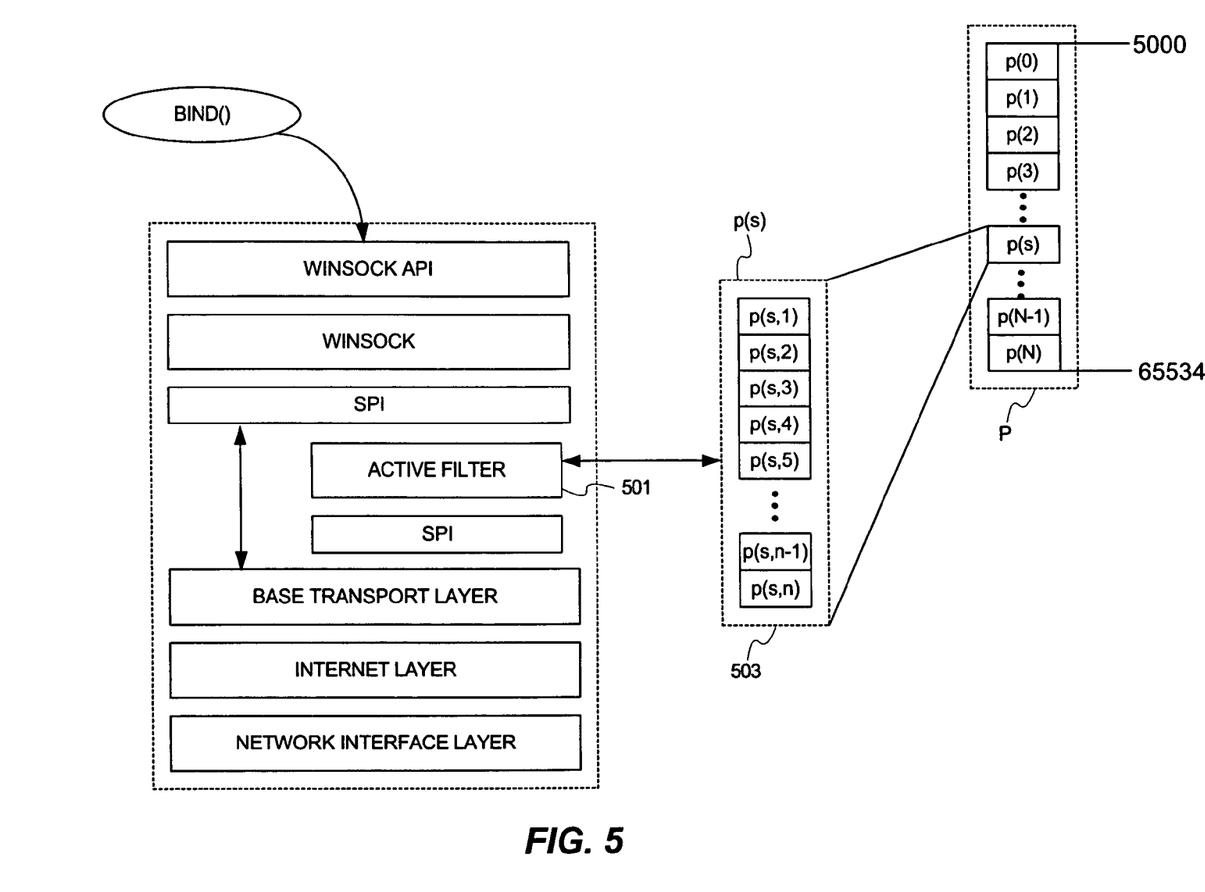
FIG. 5 illustrates entities and data structures that interact in an exemplary operation of the present invention.

By way of the example shown in FIG. 5, let P represent the set of all of a machine's available ephemeral ports. In a particular implementation port numbers 5000 through 65535 are used, although any port range can be potentially used subject to port numbers that are allocated for particular purposes (e.g., well-known ports) or otherwise unavailable. Let N represent the maximum number of users that can be concurrently supported by the multi-user system, which may range from a few concurrent users to ten thousand or more depending on the particular implementation. The range of ephemeral ports P is divided into partitions p(0), p(1), . . . , p(N), where each partition has a "n" port numbers which is the total number of ports (P) divided by the number of users (N). One or more partitions p(N) can be allocated to each concurrent user.

It is important that each user have access to a sufficient quantity of port numbers so that port numbers can be assigned to each user process that requests access to the network. When the port number partition scheme described above is used, each range should have sufficient port numbers to satisfy user needs, or a mechanism should be provided to allocate multiple ranges to a given session ID. With nearly 60000 port numbers available for assignment, and a typical maximum number of concurrent users in the range of about 200, each concurrent user can be allocated about 300 port addresses which is adequate for most conceivable purposes.

Continuing reference to FIG. 5, in a Windows environment a process calls the bind( ) function of the winsock API to gain access to the network. When the bind requests is for a TCP port and the requested port is 0, the winsock processes normally assigns an ephemeral port in the range [0, 5000] and handles the request in the base transport layer. In accordance with the present invention a request for a port number 0 is directed by the service provide interface (SPI) to be handled by the active filter processes 501 rather than being handled by the base protocol layer. When the bind requests is for a TCP port and the requested port is not 0, the normal winsock processes are used which attempt to assign the specifically stated port.

Active filter processes 501 receive the request for an ephemeral port assignment (e.g., a request for a TCP socket with the port value 0). Active filter processes 501 determine the session ID "s" associated with the process making the request the session ID of the requesting process is retrieved via a system call during operation 309 shown in FIG. 3. Each user on a multi-user machine has an associated session ID that is assigned by the system. In Windows 2000 and similar operating systems, for example, session IDs are recycled, such that a session ID will never (or very rarely) be larger than the largest number of concurrent users connected to the machine. Specifically, in a system with 200 allowed concurrent users, the number of session IDs will be less than 200 and typically the session ID values will range from 0 to 199. A system call can retrieve the session ID associated with the current process, therefore uniquely identifying the user associated with the process.

The session ID, in turn, is used to identify a particular partition p(s) associated with that session. In operation 310 of FIG. 3, a port number out of the partition p(s) is used as an index into the port partitions. For example, session ID s=5 receives a port number assignment from partition p(5). The partition may have tens or hundreds of port numbers associated with it, and the particular manner in which port numbers are assigned from within a partition can be adjusted to meet the needs of a particular application.

Care should be taken to ensure that port numbers that are in use are not assigned to other processes. The allocation made by active filter 501 relies on maintaining a bitmap 503 of free port numbers that is shared between processes in the session.

Once a port number has been assigned, control returns via the SPI to the base transport layer processes, which invoke the base provider's bind routine to complete the operation. Because there is a possibility that the port number requested by active filter 501 was already in use (this would happen, for example, if a non-WinSock application had been assigned the port), the base transport layer processes will verify that the port number is available and cause the operation to be retried when the port number is in use.

Each port allocation bitmap 503 contains one bit for every local port number that may be assigned in the current session, representing a used port with a 1 and a free port with a 0. The data used for the bitmap is shared between multiple processes running in the same session such that they have a common view of the available ports. In a particular implementation, each port allocation bitmap 503 is protected by a mutex construct.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for performing user resolution using a network address that is shared by multiple users and a port number, the method comprising:
    capturing a user name for each user when each user logs into a multi-user system for a session;
    correlating a session ID with each user;
    apportioning a range of available port numbers into a number of partitions, wherein the number of partitions is selected to provide a partition for each concurrent user of the multi-user system;
    allocating a locally unique set of port numbers to each user for that user's session, wherein the locally unique set of port numbers allocated to that user is not assigned during that user's session to a different user;
    causing port number requests initiated by a process within a particular user's session to be assigned a port number from within a partition allocated to that particular user;
    for each user, storing a user name resolution record comprising the user name, a network address, and an indication of the locally unique set of port numbers allocated to that user;
    retrieving the user name from the user name resolution record using a network address and a port number; and
    resolving the user name from information contained in each network communication packet by extracting the network address and port number corresponding to a network packet indicia.

2. The method of claim 1, wherein the user name resolution record further comprises time information indicating when the network session was initiated.

3. The method of claim 1, wherein the user name is captured using security auditing information made available by a domain controller coupled to the network.

4. The method of claim 1, wherein the range of port numbers assigned to each user is assigned by a transport layer process.

5. The method of claim 1, further comprising:
retrieving the user name from the user name resolution record using the network address and time at which a particular network communication occurred.

6. A network-coupled computing device implementing the method of claim 1.

7. A memory device for storing a user name resolution database for access by an application program being executed on a data processing system, said memory comprising:
a plurality of records stored in said memory and used by said application,
wherein each record corresponds to a particular user and each record comprises
a logon time,
a network address, and
an indication of a locally unique set of port numbers allocated to that user for that user's session,
wherein the locally unique set of port numbers allocated to that user is not assigned during that user's session to a different user, and
wherein said application is configured to
capture a user name for each user when each user logs into a multi-user system for a session;
correlate a session ID with each user;
apportion a range of available port numbers into a number of partitions, wherein the number of partitions is selected to provide a partition for each concurrent user of the multi-user system;
allocate a locally unique set of port numbers to each user for that user's session;
cause port number requests initiated by a process within a particular user's session to be assigned a port number from within a partition allocated to that particular user;
for each user, store a user name resolution record comprising the user name, a network address, and an indication of the locally unique set of port numbers allocated to that user;
retrieve the user name from the user name resolution record using a network address and a port number; and
resolve the user name from information contained in each network communication packet by extracting the network address and port number corresponding to a network packet indicia.

8. The user name resolution database stored in said memory of claim 7, wherein the indication of the set of port numbers is a session ID associated with the user.

9. A network management device, comprising:
an interface for coupling to a network;
a user name resolution data structure having a plurality of records,
wherein each record comprises fields indicating a logon time and a network address for a particular user as well as an indication of the set of port numbers allocated to that user for that user's session, and
wherein the locally unique set of port numbers allocated to that user is not assigned during that user's session to a different user; and
a component for determining a particular user name from a given network address and a given port number obtained from a communication packet indicia,
wherein the device is operable to
correlate a session ID with each user;
apportion a range of available port numbers into a number of partitions,
wherein the number of partitions is selected to provide a partition for each concurrent user of the multi-user system; and
cause port number requests initiated by a process within a particular user's session to be assigned a port number from within a partition allocated to that particular user.

10. The network management device of claim 9, wherein the device is operable to identify a particular user associated with web (HTTP) traffic on the network.

11. The network management device of claim 9, wherein the device is operable to identify a particular user associated with email (SMTP) traffic on the network.

12. The network management device of claim 9, wherein the device is operable to identify a particular user associated with peer-to-peer (p2p) messaging traffic on the network.

13. The network management device of claim 9, wherein the device is operable to identify a particular user associated with file transfer protocol (FTP) traffic on the network.

14. The network management device of claim 9, wherein the device is operable to identify a particular user associated with instant messaging traffic on the network.

15. The network management device of claim 9, wherein the device is operable to identify a particular user associated with online game traffic on the network.

16. The network management device of claim 9, further comprising:
a blocking component operable to selectively block communication packets associated with a particular user.

17. The network management device of claim 9, further comprising:
a blocking component operable to selectively block communication packets associated with a first user and a particular network accessible resource while allowing communication packets from a second user and the particular network accessible resource.

18. The network management device of claim 9, further comprising:
a bandwidth management component operable to enforce per-user bandwidth policy using the address and port number obtained from communication packets.

* * * * *